US012641218B2

(12) United States Patent
Jang

(10) Patent No.: US 12,641,218 B2
(45) Date of Patent: May 26, 2026

(54) IMAGE ENCODING/DECODING METHOD AND DEVICE, AND RECORDING MEDIUM HAVING BITSTREAM STORED THEREON

(71) Applicant: LG Electronics Inc., Seoul (KR)

(72) Inventor: Hyeongmoon Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/727,635

(22) PCT Filed: Jan. 9, 2023

(86) PCT No.: PCT/KR2023/000393
§ 371 (c)(1),
(2) Date: Jul. 9, 2024

(87) PCT Pub. No.: WO2023/132723
PCT Pub. Date: Jul. 13, 2023

(65) Prior Publication Data
US 2025/0106381 A1      Mar. 27, 2025

Related U.S. Application Data

(60) Provisional application No. 63/297,789, filed on Jan. 9, 2022.

(51) Int. Cl.
H04N 19/105          (2014.01)
H04N 19/139          (2014.01)
(Continued)

(52) U.S. Cl.
CPC ......... H04N 19/105 (2014.11); H04N 19/139 (2014.11); H04N 19/176 (2014.11); H04N 19/521 (2014.11)

(58) Field of Classification Search
CPC .. H04N 19/105; H04N 19/109; H04N 19/139; H04N 19/176; H04N 19/52; H04N 19/521; H04N 19/577
See application file for complete search history.

(56) References Cited

U.S. PATENT DOCUMENTS

| | | | | |
|---|---|---|---|---|
| 2013/0070855 A1* | 3/2013 | Zheng | | H04N 19/52 |
| | | | | 375/E7.125 |
| 2021/0006788 A1* | 1/2021 | Zhang | | H04N 19/139 |
| 2022/0417521 A1* | 12/2022 | Zhang | | H04N 19/192 |

FOREIGN PATENT DOCUMENTS

| | | |
|---|---|---|
| KR | 20200115322 A | 10/2020 |
| KR | 20210006304 A | 1/2021 |

(Continued)

OTHER PUBLICATIONS

Zhi Zhang et al., "Non-EE2: MVD and merge index signaling of AMVP-merge mode", JVET-Y0129-v1, Joint Video Experts Team (JVET) of ITU-T SG 16 WP 3 and ISO/IEC JTC 1/SC 29, 25th Meeting, by teleconference, 1-2, Jan. 5, 2022.

(Continued)

*Primary Examiner* — Anner Holder
(74) *Attorney, Agent, or Firm* — Bryan Cave Leighton Paisner LLP

(57) ABSTRACT

An image decoding/encoding method and device according to the present disclosure may: derive a motion vector for the current block on the basis of a merge inter mode; correct the motion vector of the current block; generate a first prediction block in a first direction and a second prediction block in a second direction, on the basis of the motion vector of the current block; and generate a prediction block for the current block on the basis of the first prediction block and the second prediction block. The motion vector of the current block includes a first motion vector in the first direction and a second motion vector in the second direction, wherein the (Continued)

first motion vector may be derived on the basis of the first inter-prediction mode and the second motion vector may be derived on the basis of the second inter-prediction mode.

6 Claims, 6 Drawing Sheets

(51) Int. Cl.
    *H04N 19/176*         (2014.01)
    *H04N 19/513*         (2014.01)

(56)             References Cited

FOREIGN PATENT DOCUMENTS

| KR | 20210130154 A | 10/2021 |
|----|---------------|---------|
| KR | 20210132247 A | 11/2021 |

OTHER PUBLICATIONS

Coban et al. "Algorithm description of Enhanced Compression Model 3 (ECM 3)," ITU-T SG 16 WP 3 and ISO/IEC JTC 1/SC 29, JVET-X2025, 28 pages, Jul. 2021.

* cited by examiner

FIG.2

Derive motion vector of
current block based on
merge inter mode ~ S400

Correct motion vector of
current block based on delta
motion vector ~ S410

Generate prediction block of
current block based on
corrected motion vector ~ S420

332

Intra prediction unit

Motion vector
derivation
unit

Motion vector
correction
unit

Prediction
block
generation
unit 500 510 520

Derive motion vector of
current block based on
merge inter mode — S600

Correct motion vector of
current block based on delta
motion vector — S610

Generate prediction block of
current block based on
corrected motion vector — S620

221

Inter prediction unit

Motion vector
derivation
unit

Motion vector
correction
unit

Prediction
block
generation
unit 700 710 720

1

IMAGE ENCODING/DECODING METHOD AND DEVICE, AND RECORDING MEDIUM HAVING BITSTREAM STORED THEREON

CROSS-REFERENCE TO RELATED APPLICATIONS

This application is the National Stage filing under 35 U.S.C. 371 of International Application No. PCT/KR2023/000393, filed on Jan. 9, 2023, which claims the benefit of earlier filing date and right of priority to U.S. provisional application No. 63/297,789, filed on Jan. 9, 2022, the contents of which are all incorporated by reference herein in their entireties.

TECHNICAL FIELD

The present disclosure relates to an image encoding/decoding method and device, and a recording medium storing a bitstream.

BACKGROUND

Recently, the demand for high-resolution and high-quality images such as HD (High Definition) images and UHD (Ultra High Definition) images has been increasing in various application fields, and accordingly, highly efficient image compression technologies are being discussed.

There are a variety of technologies such as inter-prediction technology that predicts a pixel value included in a current picture from a picture before or after a current picture with video compression technology, intra-prediction technology that predicts a pixel value included in a current picture by using pixel information in a current picture, entropy coding technology that allocates a short sign to a value with high appearance frequency and a long sign to a value with low appearance frequency, etc. and these image compression technologies may be used to effectively compress image data and transmit or store it.

SUMMARY

The present disclosure provides a method and a device for deriving a motion vector according to a merge inter mode.

The present disclosure provides a method and a device for correcting a motion vector according to a merge inter mode.

In performing inter prediction based on a merge inter mode, although a motion vector difference is signaled separately for a prediction direction that derives motion information based on an AMVP mode, there is a problem that the effect of double correction of a motion vector occurs as motion vector refinement is performed on a decoder side for a motion vector predictor. Accordingly, the present disclosure provides a method and a device for deriving a motion vector according to a merge inter mode to solve it.

An image decoding method and device according to the present disclosure may derive a motion vector of a current block based on a merge inter mode, correct a motion vector of the current block, generate a first prediction block in a first direction and a second prediction block in a second direction based on a motion vector of the current block and generate a prediction block of the current block based on the first prediction block and the second prediction block.

In an image decoding method and device according to the present disclosure, a motion vector of the current block may include a first motion vector in a first direction and a second motion vector in a second direction, the first motion vector may be derived based on a first inter prediction mode, and the second motion vector may be derived based on a second inter prediction mode.

In an image decoding method and device according to the present disclosure, the correction may be performed on at least one of the first motion vector or the second motion vector.

In an image decoding method and device according to the present disclosure, motion vector correction of the current block may be performed based on any one of a bilateral matching-based correction method or a template matching-based correction method.

In an image decoding method and device according to the present disclosure, the first inter prediction mode may be an AMVP mode, and the second inter prediction mode may be a merge mode.

An image decoding method and device according to the present disclosure may obtain a motion vector difference in the first direction from a bitstream.

In an image decoding method and device according to the present disclosure, the first prediction block may be generated based on the first motion vector and the motion vector difference.

In an image decoding method and device according to the present disclosure, correction for the first motion vector may be adaptively performed based on the motion vector difference.

In an image decoding method and device according to the present disclosure, correction for the first motion vector may be performed only when an absolute value of a horizontal component and a vertical component of the motion vector difference is smaller than or equal to a predefined first threshold value and a predefined second threshold value, respectively.

In an image decoding method and device according to the present disclosure, correction for the first motion vector may be performed only when an absolute value of a horizontal component and a vertical component of the motion vector difference is greater than or equal to a predefined third threshold value and a predefined fourth threshold value, respectively.

An image decoding method and device according to the present disclosure may add the motion vector difference to the first motion vector and perform the correction on a first motion vector to which the motion vector difference is added.

In an image decoding method and device according to the present disclosure, when the merge inter mode is applied to the current block and the first inter prediction mode is an AMVP mode, a motion vector difference for the AMVP mode may not be signaled through a bitstream.

In an image decoding method and device according to the present disclosure, when the merge inter mode is applied to the current block and the first inter prediction mode is an AMVP mode, correction for the first motion vector may not be performed.

An image encoding method and device according to the present disclosure may derive a motion vector of a current block based on a merge inter mode, correct a motion vector of the current block, generate a first prediction block in the first direction and a second prediction block in the second direction based on a motion vector of the current block and generate a prediction block of the current block based on the first prediction block and the second prediction block.

In an image encoding method and device according to the present disclosure, a motion vector of the current block may include a first motion vector in a first direction and a second motion vector in a second direction, the first motion vector may be derived based on a first inter prediction mode, and the second motion vector may be derived based on a second inter prediction mode.

In an image encoding method and device according to the present disclosure, the correction may be performed on at least one of the first motion vector or the second motion vector.

In an image encoding method and device according to the present disclosure, motion vector correction of the current block may be performed based on any one of a bilateral matching-based correction method or a template matching-based correction method.

In an image encoding method and device according to the present disclosure, the first inter prediction mode may be an AMVP mode, and the second inter prediction mode may be a merge mode.

A computer-readable digital storage medium storing encoded video/image information resulting in performing an image decoding method due to a decoding device according to the present disclosure is provided.

A computer-readable digital storage medium storing video/image information generated according to an image encoding method according to the present disclosure is provided.

A method and a device for transmitting video/image information generated according to an image encoding method according to the present disclosure are provided.

According to the present disclosure, it is possible to efficiently derive a motion vector according to a merge inter mode in terms of a decoding device, while minimizing signaling of information for deriving a motion vector.

According to the present disclosure, the accuracy of a motion vector may be improved through correction based on bilateral matching or template matching.

According to the present disclosure, compression performance may be improved by eliminating the double correction effect of a motion vector due to motion vector correction and motion vector difference transmission.

BRIEF DESCRIPTION OF THE DRAWINGS

FIG. 2 shows a rough block diagram of an encoding device to which an embodiment of the present disclosure may be applied and encoding of a video/image signal is performed.

DETAILED DESCRIPTION

Figure 1:
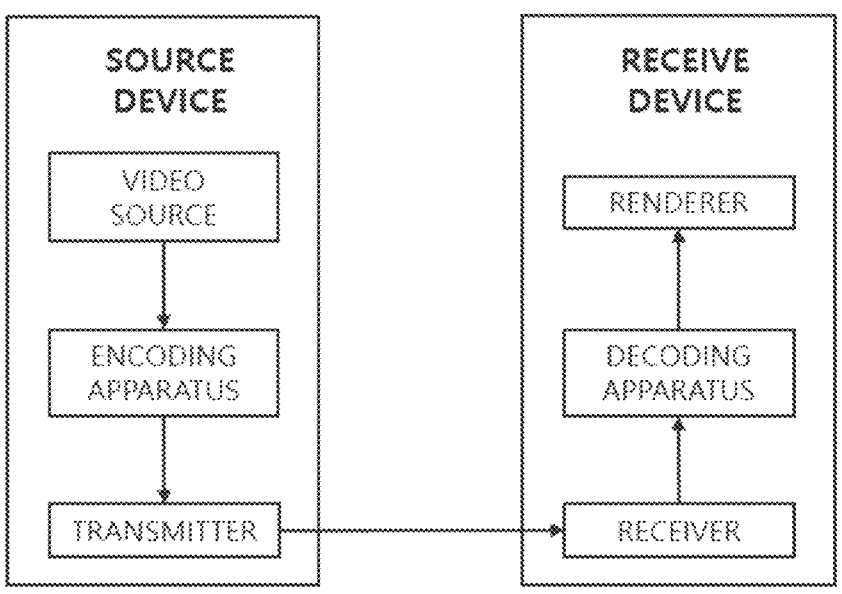
FIG. 1 shows a video/image coding system according to the present disclosure.

Since the present disclosure may make various changes and have several embodiments, specific embodiments will be illustrated in a drawing and described in detail in a detailed description. However, it is not intended to limit the present disclosure to a specific embodiment, and should be understood to include all changes, equivalents and substitutes included in the spirit and technical scope of the present disclosure. While describing each drawing, similar reference numerals are used for similar components.

A term such as first, second, etc. may be used to describe various components, but the components should not be limited by the terms. The terms are used only to distinguish one component from other components. For example, a first component may be referred to as a second component without departing from the scope of a right of the present disclosure, and similarly, a second component may also be referred to as a first component. A term of and/or includes any of a plurality of related stated items or a combination of a plurality of related stated items.

When a component is referred to as "being connected" or "being linked" to another component, it should be understood that it may be directly connected or linked to another component, but another component may exist in the middle. On the other hand, when a component is referred to as "being directly connected" or "being directly linked" to another component, it should be understood that there is no another component in the middle.

A term used in this application is just used to describe a specific embodiment, and is not intended to limit the present disclosure. Singular expressions include plural expressions unless the context clearly dictates otherwise. In this application, it should be understood that a term such as "include" or "have", etc. is intended to designate the presence of features, numbers, steps, operations, components, parts or combinations thereof described in the specification, but does not exclude in advance the possibility of presence or addition of one or more other features, numbers, steps, operations, components, parts or combinations thereof.

The present disclosure relates to video/image coding. For example, a method/an embodiment disclosed herein may be applied to a method disclosed in the versatile video coding (VVC) standard. In addition, a method/an embodiment disclosed herein may be applied to a method disclosed in the essential video coding (EVC) standard, the AOMedia Video 1 (AV1) standard, the 2nd generation of audio video coding standard (AVS2) or the next-generation video/image coding standard (ex.H.267 or H.268, etc.)

This specification proposes various embodiments of video/image coding, and unless otherwise specified, the embodiments may be performed in combination with each other.

Herein, a video may refer to a set of a series of images over time. A picture generally refers to a unit representing one image in a specific time period, and a slice/a tile is a unit that forms part of a picture in coding. A slice/a tile may include at least one coding tree unit (CTU). One picture may consist of at least one slice/tile. One tile is a rectangular area composed of a plurality of CTUs within a specific tile column and a specific tile row of one picture. A tile column is a rectangular area of CTUs having the same height as that of a picture and a width designated by a syntax requirement of a picture parameter set. A tile row is a rectangular area of CTUs having a height designated by a picture parameter set and the same width as that of a picture. CTUs within one tile may be arranged consecutively according to CTU raster scan, while tiles within one picture may be arranged consecutively according to raster scan of a tile. One slice may include an integer number of complete tiles or an integer number of consecutive complete CTU rows within a tile of a picture that may be included exclusively in a single NAL unit. Meanwhile, one picture may be divided into at least two sub-pictures. A sub-picture may be a rectangular area of at least one slice within a picture.

A pixel, a pixel or a pel may refer to the minimum unit that constitutes one picture (or image). In addition, 'sample' may be used as a term corresponding to a pixel. A sample may generally represent a pixel or a pixel value, and may represent only a pixel/a pixel value of a luma component, or only a pixel/a pixel value of a chroma component.

A unit may represent a basic unit of image processing. A unit may include at least one of a specific area of a picture and information related to a corresponding area. One unit may include one luma block and two chroma (ex. cb, cr) blocks. In some cases, a unit may be used interchangeably with a term such as a block or an area, etc. In a general case, a M×N block may include a set (or an array) of transform coefficients or samples (or sample arrays) consisting of M columns and N rows.

Herein, "A or B" may refer to "only A", "only B" or "both A and B." In other words, herein, "A or B" may be interpreted as "A and/or B." For example, herein, "A, B or C" may refer to "only A", "only B", "only C" or "any combination of A, B and C)".

A slash (/) or a comma used herein may refer to "and/or." For example, "A/B" may refer to "A and/or B." Accordingly, "A/B" may refer to "only A", "only B" or "both A and B." For example, "A, B, C" may refer to "A, B, or C".

Herein, "at least one of A and B" may refer to "only A", "only B" or "both A and B". In addition, herein, an expression such as "at least one of A or B" or "at least one of A and/or B" may be interpreted in the same way as "at least one of A and B".

In addition, herein, "at least one of A, B and C" may refer to "only A", "only B", "only C", or "any combination of A, B and C". In addition, "at least one of A, B or C" or "at least one of A, B and/or C" may refer to "at least one of A, B and C".

In addition, a parenthesis used herein may refer to "for example." Specifically, when indicated as "prediction (intra prediction)", "intra prediction" may be proposed as an example of "prediction". In other words, "prediction" herein is not limited to "intra prediction" and "intra prediction" may be proposed as an example of "prediction." In addition, even when indicated as "prediction (i.e., intra prediction)", "intra prediction" may be proposed as an example of "prediction."

Herein, a technical feature described individually in one drawing may be implemented individually or simultaneously.

FIG. 1 shows a video/image coding system according to the present disclosure.

Referring to FIG. 1, a video/image coding system may include a first device (a source device) and a second device (a receiving device).

A source device may transmit encoded video/image information or data in a form of a file or streaming to a receiving device through a digital storage medium or a network. The source device may include a video source, an encoding device and a transmission unit. The receiving device may include a reception unit, a decoding device and a renderer. The encoding device may be referred to as a video/image encoding device and the decoding device may be referred to as a video/image decoding device. A transmitter may be included in an encoding device. A receiver may be included in a decoding device. A renderer may include a display unit, and a display unit may be composed of a separate device or an external component.

A video source may acquire a video/an image through a process of capturing, synthesizing or generating a video/an image. A video source may include a device of capturing a video/an image and a device of generating a video/an image. A device of capturing a video/an image may include at least one camera, a video/image archive including previously captured videos/images, etc. A device of generating a video/an image may include a computer, a tablet, a smartphone, etc. and may (electronically) generate a video/an image. For example, a virtual video/image may be generated through a computer, etc., and in this case, a process of capturing a video/an image may be replaced by a process of generating related data.

An encoding device may encode an input video/image. An encoding device may perform a series of procedures such as prediction, transform, quantization, etc. for compression and coding efficiency. Encoded data (encoded video/image information) may be output in a form of a bitstream.

A transmission unit may transmit encoded video/image information or data output in a form of a bitstream to a reception unit of a receiving device through a digital storage medium or a network in a form of a file or streaming. A digital storage medium may include various storage media such as USB, SD, CD, DVD, Blu-ray, HDD, SSD, etc. A transmission unit may include an element for generating a media file through a predetermined file format and may include an element for transmission through a broadcasting/communication network. A reception unit may receive/extract the bitstream and transmit it to a decoding device.

A decoding device may decode a video/an image by performing a series of procedures such as dequantization, inverse transform, prediction, etc. corresponding to an operation of an encoding device.

A renderer may render a decoded video/image. A rendered video/image may be displayed through a display unit.

Figure 2:
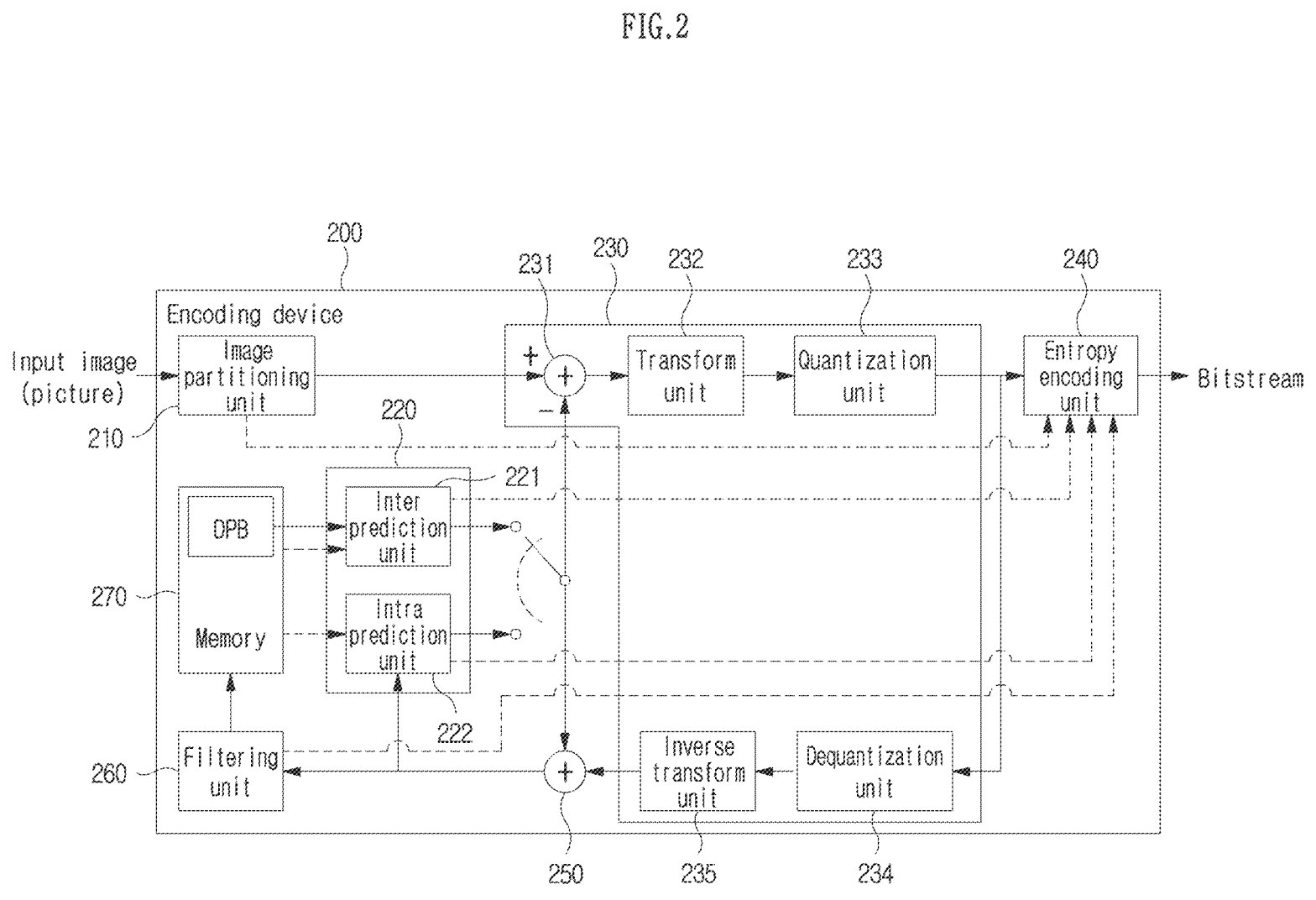

FIG. 2 shows a rough block diagram of an encoding device to which an embodiment of the present disclosure may be applied and encoding of a video/image signal is performed.

Referring to FIG. 2, an encoding device 200 may be composed of an image partitioner 210, a predictor 220, a residual processor 230, an entropy encoder 240, an adder 250, a filter 260 and a memory 270. A predictor 220 may include an inter predictor 221 and an intra predictor 222. A residual processor 230 may include a transformer 232, a quantizer 233, a dequantizer 234 and an inverse transformer 235. A residual processor 230 may further include a subtractor 231. An adder 250 may be referred to as a reconstructor or a reconstructed block generator. The above-described image partitioner 210, predictor 220, residual processor 230, entropy encoder 240, adder 250 and filter 260 may be configured by at least one hardware component (e.g., an encoder chipset or a processor) according to an embodiment. In addition, a memory 270 may include a decoded picture buffer (DPB) and may be configured by a digital storage medium. The hardware component may further include a memory 270 as an internal/external component.

An image partitioner 210 may partition an input image (or picture, frame) input to an encoding device 200 into at least one processing unit. As an example, the processing unit may be referred to as a coding unit (CU). In this case, a coding unit may be partitioned recursively according to a quad-tree binary-tree ternary-tree (QTBTTT) structure from a coding tree unit (CTU) or the largest coding unit (LCU).

For example, one coding unit may be partitioned into a plurality of coding units with a deeper depth based on a quad tree structure, a binary tree structure and/or a ternary structure. In this case, for example, a quad tree structure may be applied first and a binary tree structure and/or a ternary structure may be applied later. Alternatively, a binary tree structure may be applied before a quad tree structure. A coding procedure according to this specification may be performed based on a final coding unit that is no longer partitioned. In this case, based on coding efficiency, etc. according to an image characteristic, the largest coding unit may be directly used as a final coding unit, or if necessary, a coding unit may be recursively partitioned into coding units of a deeper depth, and a coding unit with an optimal size may be used as a final coding unit. Here, a coding procedure may include a procedure such as prediction, transform, and reconstruction, etc. described later.

As another example, the processing unit may further include a prediction unit (PU) or a transform unit (TU). In this case, the prediction unit and the transform unit may be divided or partitioned from a final coding unit described above, respectively. The prediction unit may be a unit of sample prediction, and the transform unit may be a unit for deriving a transform coefficient and/or a unit for deriving a residual signal from a transform coefficient.

In some cases, a unit may be used interchangeably with a term such as a block or an area, etc. In a general case, a M×N block may represent a set of transform coefficients or samples consisting of M columns and N rows. A sample may generally represent a pixel or a pixel value, and may represent only a pixel/a pixel value of a luma component, or only a pixel/a pixel value of a chroma component. A sample may be used as a term that makes one picture (or image) correspond to a pixel or a pel.

An encoding device 200 may subtract a prediction signal (a prediction block, a prediction sample array) output from an inter predictor 221 or an intra predictor 222 from an input image signal (an original block, an original sample array) to generate a residual signal (a residual signal, a residual sample array), and a generated residual signal is transmitted to a transformer 232. In this case, a unit that subtracts a prediction signal (a prediction block, a prediction sample array) from an input image signal (an original block, an original sample array) within an encoding device 200 may be referred to as a subtractor 231.

A predictor 220 may perform prediction on a block to be processed (hereinafter, referred to as a current block) and generate a predicted block including prediction samples for the current block. A predictor 220 may determine whether intra prediction or inter prediction is applied in a unit of a current block or a CU. A predictor 220 may generate various information on prediction such as prediction mode information, etc. and transmit it to an entropy encoder 240 as described later in a description of each prediction mode. Information on prediction may be encoded in an entropy encoder 240 and output in a form of a bitstream.

An intra predictor 222 may predict a current block by referring to samples within a current picture. The samples referred to may be positioned in the neighborhood of the current block or may be positioned a certain distance away from the current block according to a prediction mode. In intra prediction, prediction modes may include at least one nondirectional mode and a plurality of directional modes. A nondirectional mode may include at least one of a DC mode or a planar mode. A directional mode may include 33 directional modes or 65 directional modes according to a detail level of a prediction direction. However, it is an example, and more or less directional modes may be used according to a configuration. An intra predictor 222 may determine a prediction mode applied to a current block by using a prediction mode applied to a neighboring block.

An inter predictor 221 may derive a prediction block for a current block based on a reference block (a reference sample array) specified by a motion vector on a reference picture. In this case, in order to reduce the amount of motion information transmitted in an inter prediction mode, motion information may be predicted in a unit of a block, a sub-block or a sample based on the correlation of motion information between a neighboring block and a current block. The motion information may include a motion vector and a reference picture index. The motion information may further include inter prediction direction information (L0 prediction, L1 prediction, Bi prediction, etc.). For inter prediction, a neighboring block may include a spatial neighboring block existing in a current picture and a temporal neighboring block existing in a reference picture. A reference picture including the reference block and a reference picture including the temporal neighboring block may be the same or different. The temporal neighboring block may be referred to as a collocated reference block, a collocated CU (colCU), etc., and a reference picture including the temporal neighboring block may be referred to as a collocated picture (colPic). For example, an inter predictor 221 may configure a motion information candidate list based on neighboring blocks and generate information indicating which candidate is used to derive a motion vector and/or a reference picture index of the current block. Inter prediction may be performed based on various prediction modes, and for example, for a skip mode and a merge mode, an inter predictor 221 may use motion information of a neighboring block as motion information of a current block. For a skip mode, unlike a merge mode, a residual signal may not be transmitted. For a motion vector prediction (MVP) mode, a motion vector of a surrounding block is used as a motion vector predictor and a motion vector difference is signaled to indicate a motion vector of a current block.

A predictor 220 may generate a prediction signal based on various prediction methods described later. For example, a predictor may not only apply intra prediction or inter prediction for prediction for one block, but also may apply intra prediction and inter prediction simultaneously. It may be referred to as a combined inter and intra prediction (CIIP) mode. In addition, a predictor may be based on an intra block copy (IBC) prediction mode or may be based on a palette mode for prediction for a block. The IBC prediction mode or palette mode may be used for content image/video coding of a game, etc. such as screen content coding (SCC), etc. IBC basically performs prediction within a current picture, but it may be performed similarly to inter prediction in that it derives a reference block within a current picture. In other words, IBC may use at least one of inter prediction techniques described herein. A palette mode may be considered as an example of intra coding or intra prediction. When a palette mode is applied, a sample value within a picture may be signaled based on information on a palette table and a palette index. A prediction signal generated through the predictor 220 may be used to generate a reconstructed signal or a residual signal.

A transformer 232 may generate transform coefficients by applying a transform technique to a residual signal. For example, a transform technique may include at least one of Discrete Cosine Transform (DCT), Discrete Sine Transform (DST), Karhunen-Loeve Transform (KLT), Graph-Based Transform (GBT) or Conditionally Non-linear Transform (CNT). Here, GBT refers to transform obtained from this graph when relationship information between pixels is expressed as a graph. CNT refers to transform obtained based on generating a prediction signal by using all previously reconstructed pixels. In addition, a transform process may be applied to a square pixel block in the same size or may be applied to a non-square block in a variable size.

A quantizer 233 may quantize transform coefficients and transmit them to an entropy encoder 240 and an entropy encoder 240 may encode a quantized signal (information on quantized transform coefficients) and output it as a bitstream. Information on the quantized transform coefficients may be referred to as residual information. A quantizer 233 may rearrange quantized transform coefficients in a block form into an one-dimensional vector form based on coefficient scan order, and may generate information on the quantized transform coefficients based on the quantized transform coefficients in the one-dimensional vector form.

An entropy encoder 240 may perform various encoding methods such as exponential Golomb, context-adaptive variable length coding (CAVLC), context-adaptive binary arithmetic coding (CABAC), etc. An entropy encoder 240 may encode information necessary for video/image reconstruction (e.g., a value of syntax elements, etc.) other than quantized transform coefficients together or separately.

Encoded information (ex. encoded video/image information) may be transmitted or stored in a unit of a network abstraction layer (NAL) unit in a bitstream form. The video/image information may further include information on various parameter sets such as an adaptation parameter set (APS), a picture parameter set (PPS), a sequence parameter set (SPS) or a video parameter set (VPS), etc. In addition, the video/image information may further include general constraint information. Herein, information and/or syntax elements transmitted/signaled from an encoding device to a decoding device may be included in video/image information. The video/image information may be encoded through the above-described encoding procedure and included in the bitstream. The bitstream may be transmitted through a network or may be stored in a digital storage medium. Here, a network may include a broadcasting network and/or a communication network, etc. and a digital storage medium may include various storage media such as USB, SD, CD, DVD, Blu-ray, HDD, SSD, etc. A transmission unit (not shown) for transmitting and/or a storage unit (not shown) for storing a signal output from an entropy encoder 240 may be configured as an internal/external element of an encoding device 200, or a transmission unit may be also included in an entropy encoder 240.

Quantized transform coefficients output from a quantizer 233 may be used to generate a prediction signal. For example, a residual signal (a residual block or residual samples) may be reconstructed by applying dequantization and inverse transform to quantized transform coefficients through a dequantizer 234 and an inverse transformer 235. An adder 250 may add a reconstructed residual signal to a prediction signal output from an inter predictor 221 or an intra predictor 222 to generate a reconstructed signal (a reconstructed picture, a reconstructed block, a reconstructed sample array). When there is no residual for a block to be processed like when a skip mode is applied, a predicted block may be used as a reconstructed block. An adder 250 may be referred to as a reconstructor or a reconstructed block generator. A generated reconstructed signal may be used for intra prediction of a next block to be processed within a current picture, and may be also used for inter prediction of a next picture through filtering as described later. Meanwhile, luma mapping with chroma scaling (LMCS) may be applied in a picture encoding and/or reconstruction process.

A filter 260 may improve subjective/objective image quality by applying filtering to a reconstructed signal. For example, a filter 260 may generate a modified reconstructed picture by applying various filtering methods to a reconstructed picture, and may store the modified reconstructed picture in a memory 270, specifically in a DPB of a memory 270. The various filtering methods may include deblocking filtering, sample adaptive offset, adaptive loop filter, bilateral filter, etc. A filter 260 may generate various information on filtering and transmit it to an entropy encoder 240. Information on filtering may be encoded in an entropy encoder 240 and output in a form of a bitstream.

A modified reconstructed picture transmitted to a memory 270 may be used as a reference picture in an inter predictpr 221. When inter prediction is applied through it, an encoding device may avoid prediction mismatch in an encoding device 200 and a decoding device, and may also improve encoding efficiency.

A DPB of a memory 270 may store a modified reconstructed picture to use it as a reference picture in an inter predictor 221. A memory 270 may store motion information of a block from which motion information in a current picture is derived (or encoded) and/or motion information of blocks in a pre-reconstructed picture. The stored motion information may be transmitted to an inter predictor 221 to be used as motion information of a spatial neighboring block or motion information of a temporal neighboring block. A memory 270 may store reconstructed samples of reconstructed blocks in a current picture and transmit them to an intra predictor 222.

Figure 3:
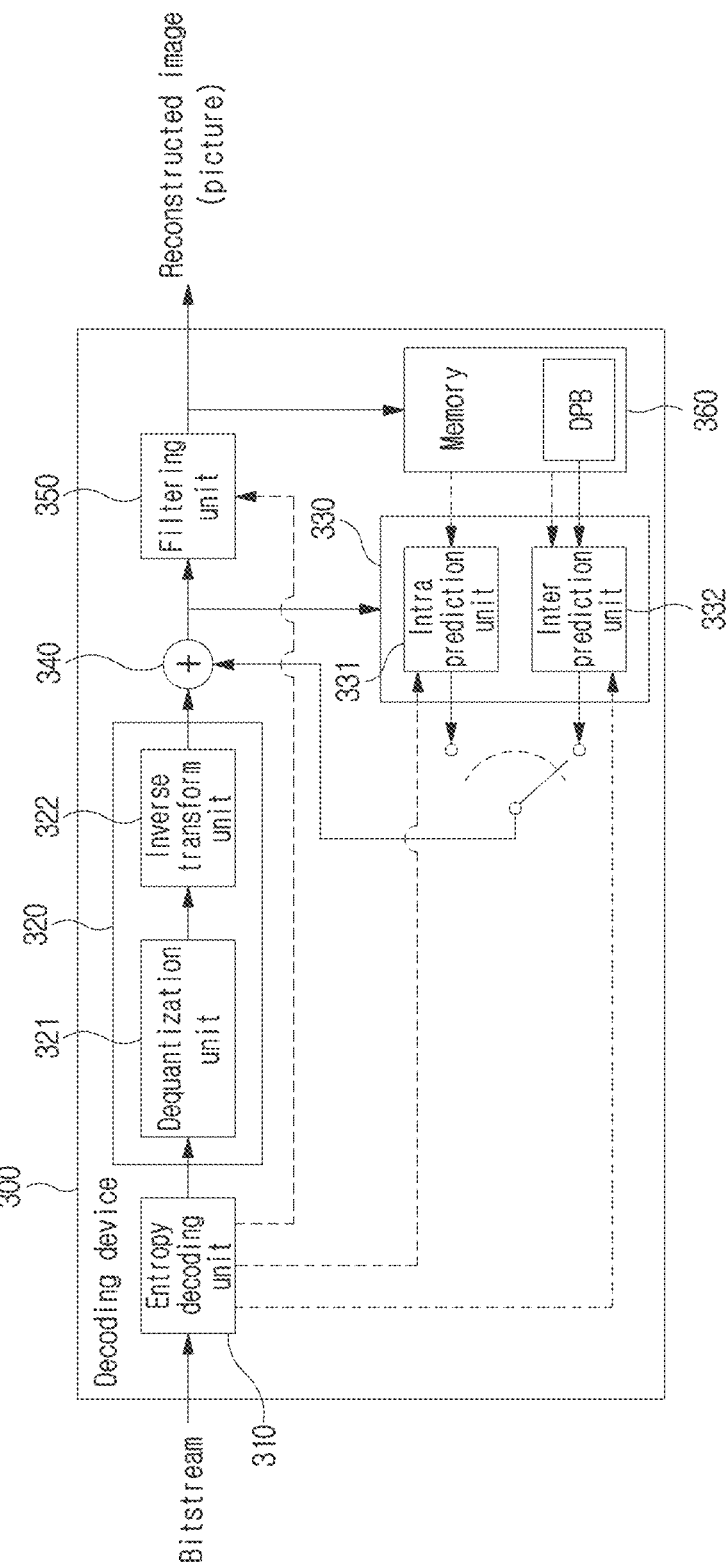
FIG. 3 shows a rough block diagram of a decoding device to which an embodiment of the present disclosure may be applied and decoding of a video/image signal is performed.

FIG. 3 shows a rough block diagram of a decoding device to which an embodiment of the present disclosure may be applied and decoding of a video/image signal is performed.

Referring to FIG. 3, a decoding device 300 may be configured by including an entropy decoder 310, a residual processor 320, a predictor 330, an adder 340, a filter 350 and a memory 360. A predictor 330 may include an inter predictor 331 and an intra predictor 332. A residual processor 320 may include a dequantizer 321 and an inverse transformer 321.

According to an embodiment, the above-described entropy decoder 310, residual processor 320, predictor 330, adder 340 and filter 350 may be configured by one hardware component (e.g., a decoder chipset or a processor). In addition, a memory 360 may include a decoded picture buffer (DPB) and may be configured by a digital storage medium. The hardware component may further include a memory 360 as an internal/external component.

When a bitstream including video/image information is input, a decoding device 300 may reconstruct an image in response to a process in which video/image information is processed in an encoding device of FIG. 2. For example, a decoding device 300 may derive units/blocks based on block partition-related information obtained from the bitstream. A decoding device 300 may perform decoding by using a processing unit applied in an encoding device. Accordingly, a processing unit of decoding may be a coding unit, and a coding unit may be partitioned from a coding tree unit or the target coding unit according to a quad tree structure, a binary tree structure and/or a ternary tree structure. At least one transform unit may be derived from a coding unit. And, a reconstructed image signal decoded and output through a decoding device 300 may be played through a playback device.

A decoding device 300 may receive a signal output from an encoding device of FIG. 2 in a form of a bitstream, and a received signal may be decoded through an entropy decoder 310. For example, an entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS) or a video parameter set (VPS), etc. In addition, the video/image information may further include general constraint information. A decoding device may decode a picture further based on information on the parameter set and/or the general constraint information. Signaled/received information and/or syntax elements described later herein may be decoded through the decoding procedure and obtained from the bitstream. For example, an entropy decoder 310 may decode information in a bitstream based on a coding method such as exponential Golomb encoding, CAVLC, CABAC, etc. and output a value of a syntax element necessary for image reconstruction and quantized values of a transform coefficient regarding a residual. In more detail, a CABAC entropy decoding method may receive a bin corresponding to each syntax element from a bitstream, determine a context model by using syntax element information to be decoded, decoding information of a surrounding block and a block to be decoded or information of a symbol/a bin decoded in a previous step, perform arithmetic decoding of a bin by predicting a probability of occurrence of a bin according to a determined context model and generate a symbol corresponding to a value of each syntax element. In this case, a CABAC entropy decoding method may update a context model by using information on a decoded symbol/bin for a context model of a next symbol/bin after determining a context model. Among information decoded in an entropy decoder 310, information on prediction is provided to a predictor (an inter predictor 332 and an intra predictor 331), and a residual value on which entropy decoding was performed in an entropy decoder 310, i.e., quantized transform coefficients and related parameter information may be input to a residual processor 320. A residual processor 320 may derive a residual signal (a residual block, residual samples, a residual sample array). In addition, information on filtering among information decoded in an entropy decoder 310 may be provided to a filter 350. Meanwhile, a reception unit (not shown) that receives a signal output from an encoding device may be further configured as an internal/external element of a decoding device 300 or a reception unit may be a component of an entropy decoder 310.

Meanwhile, a decoding device according to this specification may be referred to as a video/image/picture decoding device, and the decoding device may be divided into an information decoder (a video/image/picture information decoder) and a sample decoder (a video/image/picture sample decoder). The information decoder may include the entropy decoder 310 and the sample decoder may include at least one of dequantizer 321, the inverse transformer 322, the adder 340, the filter 350, the memory 360, the inter predictor 332 and the intra predictor 331.

A dequantizer 321 may dequantize quantized transform coefficients and output transform coefficients. A dequantizer 321 may rearrange quantized transform coefficients into a two-dimensional block form. In this case, the rearrangement may be performed based on coefficient scan order performed in an encoding device. A dequantizer 321 may perform dequantization on quantized transform coefficients by using a quantization parameter (e.g., quantization step size information) and obtain transform coefficients.

An inverse transformer 322 inversely transforms transform coefficients to obtain a residual signal (a residual block, a residual sample array).

A predictor 320 may perform prediction on a current block and generate a predicted block including prediction samples for the current block. A predictor 320 may determine whether intra prediction or inter prediction is applied to the current block based on the information on prediction output from an entropy decoder 310 and determine a specific intra/inter prediction mode.

A predictor 320 may generate a prediction signal based on various prediction methods described later. For example, a predictor 320 may not only apply intra prediction or inter prediction for prediction for one block, but also may apply intra prediction and inter prediction simultaneously. It may be referred to as a combined inter and intra prediction (CIIP) mode. In addition, a predictor may be based on an intra block copy (IBC) prediction mode or may be based on a palette mode for prediction for a block. The IBC prediction mode or palette mode may be used for content image/video coding of a game, etc. such as screen content coding (SCC), etc. IBC basically performs prediction within a current picture, but it may be performed similarly to inter prediction in that it derives a reference block within a current picture. In other words, IBC may use at least one of inter prediction techniques described herein. A palette mode may be considered as an example of intra coding or intra prediction. When a palette mode is applied, information on a palette table and a palette index may be included in the video/image information and signaled.

An intra predictor 331 may predict a current block by referring to samples within a current picture. The samples referred to may be positioned in the neighborhood of the current block or may be positioned a certain distance away from the current block according to a prediction mode. In intra prediction, prediction modes may include at least one nondirectional mode and a plurality of directional modes. An intra predictor 331 may determine a prediction mode applied to a current block by using a prediction mode applied to a neighboring block.

An inter predictor 332 may derive a prediction block for a current block based on a reference block (a reference sample array) specified by a motion vector on a reference picture. In this case, in order to reduce the amount of motion information transmitted in an inter prediction mode, motion information may be predicted in a unit of a block, a sub-block or a sample based on the correlation of motion information between a neighboring block and a current block. The motion information may include a motion vector and a reference picture index. The motion information may further include inter prediction direction information (L0 prediction, L1 prediction, Bi prediction, etc.). For inter prediction, a neighboring block may include a spatial neighboring block existing in a current picture and a temporal neighboring block existing in a reference picture. For example, an inter predictor 332 may configure a motion information candidate list based on neighboring blocks and derive a motion vector and/or a reference picture index of the current block based on received candidate selection information. Inter prediction may be performed based on various prediction modes, and the information on prediction may include information indicating an inter prediction mode for the current block.

An adder 340 may add an obtained residual signal to a prediction signal (a prediction block, a prediction sample array) output from a predictor (including an inter predictor 332 and/or an intra predictor 331) to generate a reconstructed signal (a reconstructed picture, a reconstructed block, a reconstructed sample array). When there is no residual for a block to be processed like when a skip mode is applied, a prediction block may be used as a reconstructed block.

An adder 340 may be referred to as a reconstructor or a reconstructed block generator. A generated reconstructed signal may be used for intra prediction of a next block to be processed in a current picture, may be output through filtering as described later or may be used for inter prediction of a next picture. Meanwhile, luma mapping with chroma scaling (LMCS) may be applied in a picture decoding process.

A filter 350 may improve subjective/objective image quality by applying filtering to a reconstructed signal. For example, a filter 350 may generate a modified reconstructed picture by applying various filtering methods to a reconstructed picture and transmit the modified reconstructed picture to a memory 360, specifically a DPB of a memory 360. The various filtering methods may include deblocking filtering, sample adaptive offset, adaptive loop filter, bilateral filter, etc.

The (modified) reconstructed picture stored in the DPB of the memory 360 can be used as a reference picture in the inter prediction unit 332. A memory 360 may store motion information of a block from which motion information in a current picture is derived (or decoded) and/or motion information of blocks in a pre-reconstructed picture. The stored motion information may be transmitted to an inter predictor 260 to be used as motion information of a spatial neighboring block or motion information of a temporal neighboring block. A memory 360 may store reconstructed samples of reconstructed blocks in a current picture and transmit them to an intra predictor 331.

Herein, embodiments described in a filter 260, an inter predictor 221 and an intra predictor 222 of an encoding device 200 may be also applied equally or correspondingly to a filter 350, an inter predictor 332 and an intra predictor 331 of a decoding device 300, respectively.

Figure 4:
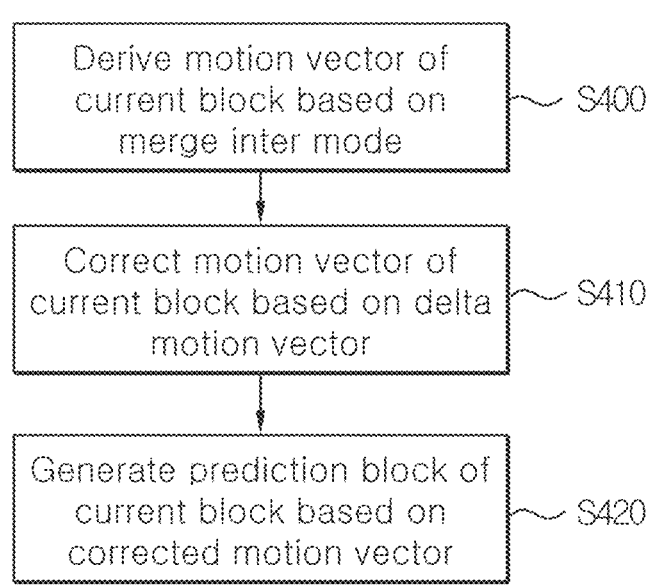
FIG. 4 shows an inter prediction method based on a merge inter mode performed by a decoding device, as an embodiment according to the present disclosure.

FIG. 4 shows an inter prediction method based on a merge inter mode performed by a decoding device, as an embodiment according to the present disclosure.

Referring to FIG. 4, a motion vector of a current block may be derived based on a merge inter mode S400.

A motion vector of a current block may include a motion vector for bilateral prediction, i.e., a motion vector in a first direction and a motion vector in a second direction. Here, a first direction may refer to a LX direction, and a second direction may refer to a L(1−X) direction, respectively (X is 0 or 1). A motion vector in a first direction may be derived based on a first inter prediction mode among the inter prediction modes pre-defined in a decoding device, and motion information in a second direction may be derived based on a second inter prediction mode among the inter prediction modes pre-defined in a decoding device.

Based on information showing whether a first inter prediction mode is applied to a L0 direction or whether a second inter prediction mode is applied to a L0 direction, a first direction to which a first inter prediction mode is applied and a second direction to which a second inter prediction mode is applied may be specified. As an example, when the information is a first value, a first inter prediction mode may be applied to a L0 direction, and a second inter prediction mode may be applied to a L1 direction. On the other hand, when the information is a second value, a first inter prediction mode may be applied to a L1 direction and a second inter prediction mode may be applied to a L0 direction.

Alternatively, regardless of the above-described information, a direction to which a first inter prediction mode or a second inter prediction mode is applied may be pre-defined in the same way for an encoding device and a decoding device. As an example, it may be defined that a first inter prediction mode is applied to a L0 direction, and a second inter prediction mode is applied to a L1 direction. Conversely, it may be also defined that a second inter prediction mode is applied to a L0 direction and a first inter prediction mode is applied to a L1 direction.

Hereinafter, for convenience of a description, it is assumed that a first inter prediction mode is an AMVP mode and a second inter prediction mode is a merge mode.

In an AMVP mode, a motion vector in a first direction may be derived as any one of a plurality of candidate motion vectors belonging to a motion prediction candidate list. A plurality of candidate motion vectors may include at least one of a motion vector of at least one spatial neighboring block adjacent to a current block or a motion vector of a temporal neighboring block of a current block.

Any one of the plurality of candidate motion vectors may be specified based on a candidate index. The candidate index may indicate any one of a plurality of candidate motion vectors. Here, a candidate index may be signaled through a bitstream. Alternatively, any one of the plurality of candidate motion vectors may be specified based on a candidate flag. The candidate flag may indicate any one of two candidate motion vectors. Here, a candidate index/a candidate flag may be signaled through a bitstream.

Alternatively, any one of the plurality of candidate motion vectors may be specified based on a template matching-based cost. Specifically, for each of a plurality of candidate motion vectors belonging to a motion prediction candidate list, a sample difference (e.g., SAD, sum of absolute difference) between a template region of a spatial or temporal neighboring block with a corresponding candidate motion vector and a template region of a current block may be calculated, and a calculated sample difference may be used as a cost. In this case, a motion vector in the first direction may be derived as a candidate motion vector with the smallest sample difference among the calculated sample differences.

Alternatively, the template matching-based cost may be calculated for only some of a plurality of candidate motion vectors belonging to a motion prediction candidate list. Here, some candidate motion vectors may refer to M top candidate motion vectors with the smallest candidate index among a plurality of candidate motion vectors. M is an integer of 1, 2, 3 or higher, and may be smaller than the number of candidate motion vectors belonging to a motion prediction candidate list. Alternatively, some candidate motion vectors may refer to motion vectors of one or more spatial neighboring blocks excluding a motion vector of a temporal neighboring block among a plurality of candidate motion vectors. Alternatively, some candidate motion vectors may refer to a candidate motion vector at a position pre-defined equally for an encoding device and a decoding device. Here, a pre-defined position may include at least one of the top or the left of a current block.

If the template region is available, a motion vector in a first direction may be derived based on a template matching-based cost, and signaling of a candidate index may be omitted. On the other hand, if the template region is not available, the candidate index may be signaled, and a motion vector in a first direction may be derived based on a signaled candidate index.

In a merge mode, a motion vector in a second direction may be derived based on any one of a plurality of merge candidates belonging to a merge candidate list. A plurality of merge candidates may include at least one of at least one spatial merge candidate adjacent to a current block or a temporal merge candidate of a current block.

Any one of the plurality of merge candidates may be specified based on a merge index. The merge index may indicate any one of a plurality of merge candidates. Here, a merge index may be signaled through a bitstream.

Alternatively, any one of the plurality of merge candidates may be specified based on a bilateral matching-based cost.

As an example, for each of a plurality of merge candidates belonging to a merge candidate list, a sample difference (e.g., SAD) between a first reference block specified by motion information in a first direction and a second reference block specified by motion information of a corresponding merge candidate may be calculated, and a calculated sample difference may be used as a cost. In this case, a motion vector in the second direction may be derived as a motion vector of a merge candidate with the smallest sample difference among the calculated sample differences. The first reference block may be specified based on a reference picture indicated by a motion vector in a first direction derived above and a reference picture index in a first direction. The second reference block may be specified based on a reference picture indicated by a motion vector in a second direction of a corresponding merge candidate and a reference picture index in a second direction of a corresponding merge candidate.

Alternatively, the bilateral matching-based cost may be calculated for only some of a plurality of merge candidates belonging to a merge candidate list. Here, some merge candidates may refer to N top merge candidates with the smallest merge index among a plurality of merge candidates. N is an integer of 1, 2, 3 or higher, and may be smaller than the number of merge candidates belonging to a merge candidate list. Alternatively, some merge candidates may refer to one or more spatial merge candidates excluding a temporal merge candidate among a plurality of merge candidates. Alternatively, some merge candidates may refer to a merge candidate at a position pre-defined equally for an encoding device and a decoding device. Here, a pre-defined position may include at least one of the top or the left of a current block.

A motion vector in a second direction may be derived by selectively using any one of a merge index or a bilateral matching-based cost described above. A flag showing whether a bilateral matching-based cost is used for the selective use may be used. Here, a flag may be signaled through a bitstream, or may be implicitly derived based on a parameter of a current block. Here, a parameter may include at least one of a size, a shape, a partition type, a component type, the maximum number of merge candidates belonging to a merge candidate list, or whether a spatial/temporal neighboring block is available.

Referring to FIG. 4, a motion vector of a current block derived above may be corrected based on a predetermined delta motion vector S410.

A delta motion vector may be used to correct a motion vector of a current block according to a merge inter mode. The delta motion vector may be determined based on any one of bilateral matching or template matching, which is described in detail below.

Bilateral Matching-Based Correction Method

A decoding device may calculate a SAD array by performing a search based on a position of a reference block of a current block within a predetermined search range.

A reference block of the current block may include a reference block in a first direction (hereinafter, referred to as a first reference block) and a reference block in a second direction (hereinafter, referred to as a second reference block) A first reference block may be specified by motion information according to an AMVP mode described above. In other words, a first reference block may be specified based on a reference picture indicated by a motion vector in a first direction and a reference picture index in a first direction. A reference picture index in a first direction may be signaled for a current block through a bitstream. A second reference block may be specified by motion information according to a merge mode described above. In other words, a second reference block may be specified based on a reference picture indicated by a motion vector in a second direction and a reference picture index in a second direction. A reference picture index in a second direction may be a reference picture index of a merge candidate specified in S400.

The SAD array may be composed of a plurality of SADs calculated per search position within the search range. Each SAD may be calculated as a sample difference between at least two blocks searched in both directions. In this case, a block searched in a first direction is called a LX block, and a block searched in a second direction is called a L(1−X) block. The SAD may be calculated based on all samples belonging to LX and L(1−X) blocks, or may be calculated based on some samples within LX and L(1−X) blocks.

Here, some samples refer to a sub-block of LX and L(1−X) blocks, and at least one of a width or a height of a sub-block may be half a width or a height of LX and L(1−X) blocks. In other words, LX and L(1−X) blocks have a size of W×H, and the some samples may be a sub-block with a size of W×H/2, W/2×H or W/2×H/2. In this case, if some samples are a sub-block of W×H/2, some samples may be a top sub-block (or a bottom sub-block) within LX and L(1−X) blocks. If some samples is a sub-block of W/2×H, some samples may be a left sub-block (or a right sub-block) within LX and L(1−X) blocks. If some samples is a sub-block of W/2×H/2, some samples may be a top-left sub-block within LX and L(1−X) blocks, but are not limited thereto.

Alternatively, some samples may be defined as at least one of even-numbered sample lines or at least one of odd-numbered sample lines of LX and L(1−X) blocks. In this case, a sample line may be a vertical sample line, or a horizontal sample line.

Alternatively, some samples may refer to a sample at a position pre-defined equally for encoding/decoding devices. For example, a sample at the pre-defined position may refer to at least one of a top-left sample, a top-right sample, a bottom-left sample, a bottom-right sample, a center sample, a center sample of a sample column/row adjacent to a boundary of a current block, or a sample positioned on a diagonal line within a current block within LX and L(1−X) blocks.

A search position within the search range may be a position shifted by p in a x-axis direction and by q in a y-axis direction from a position of a reference block of a current block. For example, when p and q are an integer belonging to a range between −1 and 1, the number of search positions in a unit of an integer pel within a search range may be up to 9. Alternatively, when p and q are an integer belonging to a range between −2 and 2, the number of search positions in a unit of an integer pel within a search range may be up to 25. However, it is not limited thereto, and p and q may be between integers whose size (or, absolute value) is greater than 2, and a search may be performed in a unit of a fractional pel.

A search position within the search range may be determined based on an offset pre-defined equally for an encoding device and a decoding device. In other words, an offset may be defined as a variant vector between a search position and a position of a reference block of a current block. The offset may include at least one of a non-directional offset or a directional offset. The directional offset may include an offset for at least one direction of the left, the right, the top, the bottom, the top-left, the top-right, the bottom-left or the bottom-right. The non-directional offset refers to an offset whose size is 0, and the directional offset refers to an offset that a size (or, an absolute value) of at least one of a x-component or a y-component of an offset is greater than or equal to 1.

As an example, an offset may be defined as in Table 1 below.

TABLE 1

| Index (i) | 0 | 1 | 2 | 3 | 4 | 5 | 6 | 7 | 8 |
|---|---|---|---|---|---|---|---|---|---|
| dX[i] | −1 | 0 | 1 | −1 | 0 | 1 | −1 | 0 | 1 |
| dY[i] | −1 | −1 | −1 | 0 | 0 | 0 | 1 | 1 | 1 |

Table 1 defines an offset specifying a search position for each index, wherein dX[i] may refer to a x-component of a i-th offset and dY[i] may refer to a y-component of a i-th offset. An offset according to Table 1 may include a non-directional offset of (0,0) and eight directional offsets. However, an index in Table 1 is only for distinguishing an offset, and it does not limit a position of an offset corresponding to an index or a priority between offsets. In addition, Table 1 shows a case in which a size of a x-component and a y-component of an offset is 1, but it is just an example, and an offset in which a size of at least one of a x-component or a y-component is greater than or equal to 2 may be defined.

The offset may be defined for a L0 direction and a L1 direction, respectively. An offset for search in a L1 direction may be determined dependently on an offset for search in a L0 direction. As an example, if an offset for search in a L0 direction is (p,q), an offset for search in a L1 direction may be configured as (−p,−q) through mirroring. Alternatively, an offset for search in a L1 direction may be determined independently from an offset for search in a L0 direction.

Information about a size and/or a direction of an offset described above may be pre-defined in the same way for an encoding device and a decoding device, or may be encoded in an encoding device and signaled to a decoding device. The information may be variably determined by considering the above-described block attribute.

Through the above-described method, a SAD corresponding to a search position (or, each pre-defined offset) within a search range may be calculated. Among a plurality of SADs in a SAD array, a SAD with the minimum value may be identified, and delta motion vector may be determined based on an offset corresponding to an identified SAD. A motion vector in a L0 direction may be corrected based on a delta motion vector (deltaMV), and a motion vector in a L1 direction may be corrected based on a mirrored delta motion vector (−deltaMV).

Template Matching-Based Correction Method

A decoding device may calculate a SAD array by performing a search based on a position of a reference block of a current block within a predetermined search range. Here, a SAD array may be composed of a plurality of SADs calculated for each search position within a search range. Each SAD may be calculated as a sample difference between a template region of a current block and template region at a search position. A template region at the search position may refer to a template region of a block that has a sample at the search position as a top-left sample.

The SAD may be calculated based on all samples belonging to a template region at a search position and a current block, or may be calculated based on some samples within a template region.

Here, some samples may refer to at least one of even-numbered sample lines or at least one of odd-numbered sample lines within a template region. In this case, a sample line may be a vertical sample line, or a horizontal sample line.

Alternatively, a template region may include at least one of a top region, a left region, a top-left region, a bottom-left region or a top-right region adjacent to a block (i.e., a current block, a block at a search position). In this case, some samples may be limited to a sample belonging to a region at a specific position within a template region. As an example, a region at a specific position may include at least one of a top region or a left region.

Alternatively, a template region may include a neighboring sample line adjacent to a block and/or at least one non-neighboring sample line. In this case, some samples may be limited to a sample belonging to a sample line at a specific position within a template region. As an example, a sample line at a specific position is pre-defined equally for an encoding device and a decoding device, and may include at least one of a neighboring sample line, a non-neighboring sample line 1-sample away from a boundary of a block, or a non-neighboring sample line 2-sample away from a boundary of a block. Information indicating a sample line at the specific position may be signaled through a bitstream.

A search position within the search range may be a position shifted by p in a x-axis direction and by q in a y-axis direction from a position of a reference block of a current block, and may be determined based on an offset pre-defined equally for an encoding device and a decoding device. It is the same as described above in 'Bilateral Matching-based Correction Method', and here, an overlapping description is omitted.

Through the above-described method, a SAD array may be calculated for each of a first direction and a second direction. Among a plurality of SADs belonging to a SAD array in a first direction, a SAD with the minimum value may be identified, and a delta motion vector in a first direction may be determined based on an offset corresponding to an identified SAD. Based on the determined delta motion vector in a first direction, a first motion vector according to an AMVP mode may be corrected. Likewise, among a plurality of SADs belonging to a SAD array in a second direction, a SAD with the minimum value may be identified, and a delta motion vector in a second direction may be determined based on an offset corresponding to an identified SAD. Based on the determined delta motion vector in a second direction, a second motion vector according to a merge mode may be corrected.

According to whether a current block satisfies a predetermined condition, any one of a bilateral matching-based correction method or a template matching-based correction method described above may be selectively used.

As an example, when a POC difference between a current picture including a current block and a first reference picture including a first reference block is the same as a POC difference between a current picture and a second reference picture including a second reference block, a bilateral matching-based correction method may be used, and otherwise, a template matching-based correction method may be used.

In addition, as an example, any one of a bilateral matching-based correction method or a template matching-based correction method may be selectively used based on a syntax element signaled at a current block level. Here, a syntax element may be syntax information such as a flag, an index, etc. signaled through a bitstream. In addition, a current block may be any one of a coding unit (CU), a prediction unit (PU), or a transform unit (TU). As an example, any one of a bilateral matching-based correction method or a template matching-based correction method may be selectively used based on any one of syntax elements signaled at a CU level or a PU level.

Referring to FIG. 4, a prediction block of a current block may be generated based on a corrected motion vector S420.

A corrected motion vector may include a corrected first motion vector and a corrected second motion vector. A prediction block in a first direction (hereinafter, referred to as a first prediction block) may be generated based on the corrected first motion vector, and a prediction block in a second direction (hereinafter, referred to as a second prediction block) may be generated based on the corrected second motion vector. Hereinafter, a method for generating a prediction block in each direction is described in detail.

For a first prediction block in a first direction, a final first motion vector may be derived based on a corrected first motion vector and a motion vector difference (mvd). The motion vector difference may be signaled through a bitstream. A first prediction block of a current block may be generated based on a final first motion vector.

For a second prediction block in a second direction, a final second motion vector may be derived based on a corrected second motion vector, and a second prediction block of a current block may be generated based on the final second motion vector.

As described above, in performing inter prediction based on a merge inter mode, although a motion vector difference is signaled separately for a prediction direction in which motion information is derived based on an AMVP mode, there is a problem that the effect of double correction of a motion vector occurs as motion vector refinement is performed on a decoder side for a motion vector predictor. Accordingly, multiple embodiments to solve this are described below.

In an embodiment of the present disclosure, when merge inter mode-based prediction is performed, a method for performing prediction without signaling a motion vector difference for a prediction direction in which motion information is derived based on an AMVP mode is proposed.

As described above, when a merge inter mode is applied, motion vector correction on a decoder side is performed according to a predetermined condition for a motion vector predictor derived from a prediction candidate. Afterwards, a motion vector difference signaled from a bitstream is applied to a corrected motion vector to additionally compensate for a motion vector, and then a prediction block is generated based on a compensated motion vector.

In other words, according to the above-described embodiment, although a motion vector correction process is performed on a decoder side to ensure that a reference block has the lowest error in a search region, there is a problem that a motion vector difference is finally applied to a corrected motion vector to additionally compensate for a motion vector and generate a prediction block without using motion information with the lowest error, deteriorating performance of a prediction block. As an embodiment, in order to solve this problem, when a merge inter mode is applied, a motion vector difference may not be signaled for a prediction direction in which motion information is derived based on an AMVP mode.

As an example, when a merge inter mode is applied to a current block and a first inter prediction mode is an AMVP mode, a motion vector difference for an AMVP mode may not be signaled through a bitstream. In other words, a motion vector predictor may be derived based on a candidate index or a candidate flag described above, and correction may be performed on a derived motion vector predictor. A prediction block may be generated based on a corrected motion vector.

In addition, in an embodiment of the present disclosure, when merge inter mode-based prediction is performed, a method for signaling a motion vector difference for a prediction direction in which motion information is derived based on an AMVP mode, but controlling motion vector correction on a decoder side according to a size of a motion vector difference is proposed. In other words, a method for adaptively performing correction based on a size of a motion vector difference is proposed.

As described above, in order to compensate for a problem of redundantly performing correction on a motion vector having the lowest error within a predefined region based on an initial motion vector, if a motion vector difference is applied to an initial motion vector to be corrected and it falls outside a predefined region, it is suggested not to perform compensation.

As an example, a decoding device may obtain a motion vector difference in a first direction from a bitstream. A decoding device may generate a first prediction block based on a first motion vector and an obtained motion vector difference. In this case, correction for a first motion vector may be adaptively performed based on a motion vector difference.

For example, correction for a first motion vector may be performed only when an absolute value of a horizontal component and a vertical component of a motion vector difference is smaller than or equal to a predefined first threshold value and a predefined second threshold value, respectively. Alternatively, for example, correction for a first motion vector may be performed only when an absolute value of a horizontal component and a vertical component of a motion vector difference is smaller than a predefined first threshold value and a predefined second threshold value, respectively. As an example, a first threshold value and a second threshold value may be the same or different.

Alternatively, for example, correction for a first motion vector may be performed only when an absolute value of a horizontal component and a vertical component of a motion vector difference is greater than or equal to a predefined third threshold value and a predefined fourth threshold value, respectively. Alternatively, for example, correction for a first motion vector may be performed only when an absolute value of a horizontal component and a vertical component of a motion vector difference is greater than a predefined third threshold value and a predefined fourth threshold value, respectively. As an example, a third threshold value and a fourth threshold value may be the same or different.

In addition, in an embodiment of the present disclosure, when merge inter mode-based prediction is performed, a method for signaling a motion vector difference for a prediction direction in which motion information is derived based on an AMVP mode, but controlling motion vector correction on a decoder side by considering whether a motion vector different is transmitted is proposed. In other words, a method for adaptively performing correction based on whether a motion vector difference is transmitted is proposed.

In other words, as described above, although an accurate motion vector may be derived for a prediction direction to which an AMVP is applied from a signaled motion vector difference, motion vector correction may be performed only for a prediction direction in which a motion vector different is not transmitted in a merge inter mode, in order to solve the problem of redundantly correcting a motion vector having the lowest error within a predefined region based on an initial motion vector.

As an embodiment, in performing a motion vector correction process, correction may be performed only in a direction in which motion information is derived based on a merge mode.

As an embodiment, when a merge inter mode is applied to a current block and a second inter prediction mode is a merge mode, correction for a second motion vector may be performed. And, when a merge inter mode is applied to a current block and a first inter prediction mode is an AMVP mode, correction for a first motion vector may not be performed.

In addition, in an embodiment of the present disclosure, when merge inter mode-based prediction is performed, a method for signaling a motion vector difference for a prediction direction in which motion information is derived based on an AMVP mode, but deriving an initial motion vector by considering (or applying) a motion vector different in a motion vector correction process on a decoder side is proposed.

In the above-described embodiment, motion vector compensation is performed by using motion information of a candidate, i.e., a motion vector predictor as an initial motion vector on which motion vector correction is performed on a decoder side, and then a signaled motion vector difference is applied to derive a final motion vector.

As such, by performing correction based on a motion vector predictor and then applying a signaled motion vector difference, there is a need to solve a problem that the effect of motion vector correction performed in an intermediate process disappears. To this end, a decoding device may apply a motion vector of a prediction candidate, i.e., a motion vector difference signaled for a motion vector predictor to derive an initial motion vector to be corrected, and then perform motion vector correction on a decoder side based thereon.

As an embodiment, a decoding device may add a motion vector difference signaled from a bitstream to a first motion vector. A decoding device may perform correction on a first motion vector to which a motion vector difference is added. In other words, motion vector correction on a decoder side may be performed on an initial motion vector, and the initial motion vector may be configured as a value obtained by adding a motion vector difference signaled from a bitstream to a motion vector predictor.

The above-described embodiments assume that a correction step in S410 is performed, but a motion vector correction process in S410 may be omitted. In this case, a prediction block generation process in S420 may be performed based on a first motion vector and a second motion vector derived in S400.

A prediction block of a current block may be generated based on the generated first prediction block or second prediction block. As an example, a prediction block of a current block may be generated through a weighted sum of a first prediction block and a second prediction block. In this case, a weight applied to a first prediction block and a weight applied to a second prediction block may be the same. Alternatively, a ratio of a weight applied to a first prediction block and a weight applied to a second prediction block may be 1:1, 2:1, 1:2, 3:1, 1:3, 5:3, 3:5, 5:−1, or −1:5. The weight for a weighted sum may be determined based on a predetermined weight index. The weight index may specify any one of a plurality of weight candidates that are pre-defined equally for an encoding device and a decoding device. At least one of a plurality of weight candidates may have at least one of the above-described weight ratios. The weight index may be signaled through a bitstream. Alternatively, the weight index may be implicitly derived by considering the existence/number/position of neighboring blocks encoded in an intra mode, the existence/number/position of neighboring blocks encoded in an inter mode, a type of an inter prediction mode, the number/position of neighboring blocks encoded in an AMVP mode, the number/position of neighboring blocks encoded in a merge mode, etc.

Figure 5:
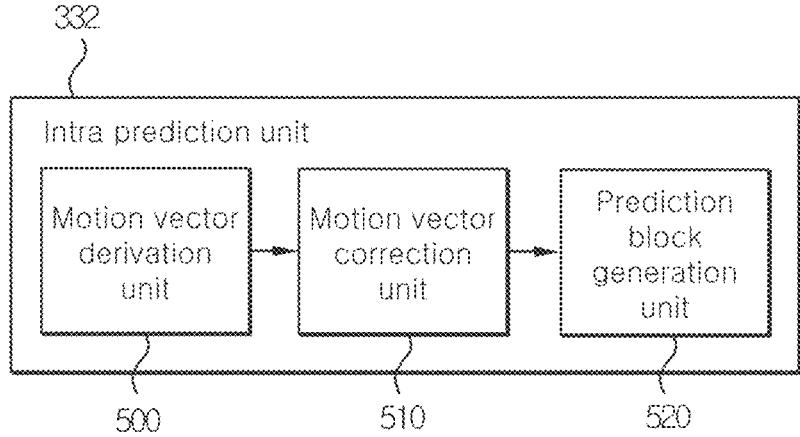
FIG. 5 shows a rough configuration of an inter prediction unit 332 that performs an inter prediction method based on a merge inter mode according to the present disclosure.

FIG. 5 shows a rough configuration of an inter prediction unit 332 that performs an inter prediction method based on a merge inter mode according to the present disclosure.

Referring to FIG. 5, an inter prediction unit 332 may include a motion vector derivation unit 500, a motion vector correction unit 510 and a prediction block generation unit 520. A motion vector derivation unit 500, a motion vector correction unit 510 and a prediction block generation unit 520 may perform S400 to S420 described above, respectively.

Specifically, a motion vector derivation unit 500 may derive a motion vector of a current block based on a merge inter mode. Here, a motion vector of a current block includes a motion vector for bilateral prediction, i.e., a motion vector in a first direction and a motion vector in a second direction, and a motion vector in a first direction and a second direction may be derived based on a different inter prediction mode. As an example, a motion vector derivation unit 500 may derive a motion vector in a first direction based on an AMVP mode, and may derive a motion vector in a second direction based on a merge mode. It is the same as described by referring to FIG. 4, and here, a detailed description is omitted.

A motion vector correction unit 510 may correct a motion vector of the current block based on a predetermined delta motion vector. In this case, a delta motion vector may be determined based on any one of a bilateral matching-based correction method or a template matching-based correction method. It is the same as described by referring to FIG. 4, and here, a detailed description is omitted.

According to whether a current block satisfies a predetermined condition, any one of a bilateral matching-based correction method or a template matching-based correction method described above may be selectively used. As an example, when a POC difference between a current picture including a current block and a first reference picture including a first reference block is the same as a POC difference between a current picture and a second reference picture including a second reference block, a bilateral matching-based correction method may be used, and otherwise, a template matching-based correction method may be used.

A prediction block generation unit 520 may generate a prediction block of a current block based on a corrected motion vector. Here, a corrected motion vector includes a corrected first motion vector and a corrected second motion vector, and a first prediction block in a first direction and a second direction block in a second direction may be generated based on corrected first and second motion vectors, respectively. A method for generating a prediction block in each direction is the same as described by referring to FIG. 4 and here, a detailed description is omitted. A prediction block generation unit 520 may generate a prediction block of a current block based on at least one of a pre-generated first prediction block and a pre-generated second prediction block. As an example, a prediction block of a current block may be generated through a weighted sum of a first prediction block and a second prediction block, which is the same as described by referring to FIG. 4.

Alternatively, if a motion vector of a current block is not corrected, a prediction block generation unit 520 may generate a prediction block of a current block by equally applying the above-described prediction block generation method based on a motion vector pre-derived according to a merge inter mode.

Figure 6:
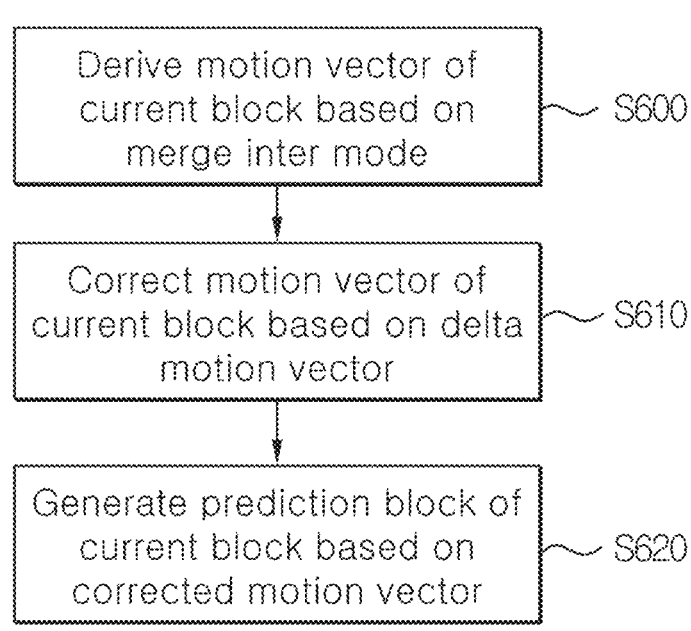
FIG. 6 shows an inter prediction method based on a merge inter mode performed by an encoding device as an embodiment according to the present disclosure.

FIG. 6 shows an inter prediction method based on a merge inter mode performed by an encoding device, as an embodiment according to the present disclosure.

Referring to FIG. 6, a motion vector of a current block may be derived based on a merge inter mode S600.

A motion vector of a current block may include a motion vector for bilateral prediction, i.e., a motion vector in a first direction and a motion vector in a second direction. Here, a motion vector of a current block includes a motion vector for bilateral prediction, i.e., a motion vector in a first direction and a motion vector in a second direction, and a motion vector in a first direction and a second direction may be derived based on a different inter prediction mode.

As an example, a motion vector in a first direction may be derived based on an AMVP mode, and a motion vector in a second direction may be derived based on a merge mode.

Specifically, a motion vector in a first direction according to an AMVP mode may be derived as any one of a plurality of candidate motion vectors belonging to a motion prediction candidate list. A candidate index indicating any one of the plurality of candidate motion vectors may be encoded and inserted into a bitstream. Alternatively, any one of the plurality of candidate motion vectors may be specified based on a template matching-based cost. It is the same as described by referring to FIG. 4, and here, a detailed description is omitted.

However, when a template region is available, a motion vector in a first direction may be derived based on a template matching-based cost, and in this case, encoding of a candidate index may be omitted. On the other hand, if a template region is not available, the candidate index may be encoded.

A motion vector in a second direction according to a merge mode may be derived based on any one of a plurality of merge candidates belonging to a merge candidate list. A merge index indicating any one of the plurality of merge candidates may be encoded and inserted into a bitstream. Alternatively, any one of the plurality of merge candidates may be specified based on a bilateral matching-based cost. It is the same as described by referring to FIG. 4, and here, a detailed description is omitted.

Referring to FIG. 6, a motion vector of a current block derived above may be corrected based on a predetermined delta motion vector S610.

A delta motion vector may be used to correct a motion vector of a current block according to a merge inter mode. The delta motion vector may be determined based on any one of bilateral matching or template matching, which is the same as described by referring to FIG. 4, and here, a detailed description is omitted. In the present disclosure, since motion vector correction on a decoder side (or correction on a decoder side) shows that correction is performed equally in an encoder and a decoder without explicit signaling from an encoder, it may be also performed in the same way in a motion vector correction encoder on a decoder side in the above-described embodiment.

Meanwhile, according to whether a current block satisfies a predetermined condition, any one of a bilateral matching-based correction method or a template matching-based correction method may be selectively used. As an example, when a POC difference between a current picture including a current block and a first reference picture including a first reference block is the same as a POC difference between a current picture and a second reference picture including a second reference block, a bilateral matching-based correction method may be used, and otherwise, a template matching-based correction method may be used.

Referring to FIG. 6, a prediction block of a current block may be generated based on a corrected motion vector S620.

A corrected motion vector may include a corrected first motion vector and a corrected second motion vector. A prediction block in a first direction (hereinafter, referred to as a first prediction block) may be generated based on the corrected first motion vector, and a prediction block in a second direction (hereinafter, referred to as a second prediction block) may be generated based on the corrected second motion vector. Hereinafter, a method for generating a prediction block in each direction is described in detail.

Meanwhile, for a second prediction block in a second direction, a final second motion vector may be derived based on a corrected second motion vector, and a second prediction block of a current block may be generated based on the final second motion vector.

In an embodiment of the present disclosure, when merge inter mode-based prediction is performed, a method for performing prediction without encoding a motion vector difference for a prediction direction in which motion information is derived based on an AMVP mode is proposed.

As described above, when a merge inter mode is applied, correction is performed according to a predetermined condition for a motion vector predictor derived from a prediction candidate. Afterwards, a motion vector is additionally compensated by applying a motion vector difference encoded in a bitstream to a corrected motion vector, and then a prediction block is generated based on a compensated motion vector.

In other words, according to the above-described embodiment, although a motion vector correction process is performed on a decoder side to ensure that a reference block has the lowest error in a search region, there is a problem that a motion vector difference is finally applied to a corrected motion vector to additionally compensate for a motion vector and generate a prediction block without using motion information with the lowest error, deteriorating performance of a prediction block. As an embodiment, in order to solve this problem, when a merge inter mode is applied, a motion vector difference may not be encoded for a prediction direction in which motion information is derived based on an AMVP mode.

As an example, when a merge inter mode is applied to a current block and a first inter prediction mode is an AMVP mode, a motion vector difference for an AMVP mode may not be encoded through a bitstream. A motion vector predictor may be specified based on a candidate index or a candidate flag described above. Correction may be performed on a derived motion vector predictor. A prediction block may be generated based on a corrected motion vector.

In addition, in an embodiment of the present disclosure, when merge inter mode-based prediction is performed, a method for encoding a motion vector difference for a prediction direction in which motion information is derived based on an AMVP mode, but controlling motion vector correction according to a size of a motion vector difference is proposed. In other words, a method for adaptively performing correction based on a size of a motion vector difference is proposed.

As described above, in order to compensate for a problem of redundantly performing correction on a motion vector having the lowest error within a predefined region based on an initial motion vector, if a motion vector difference is applied to an initial motion vector to be corrected and it falls outside a predefined region, it is suggested not to perform compensation.

As an example, an encoding device may encode a motion vector difference in a first direction into a bitstream. An encoding device may generate a first prediction block based on a first motion vector and a motion vector difference. In this case, correction for a first motion vector may be adaptively performed based on a motion vector difference.

For example, correction for a first motion vector may be performed only when an absolute value of a horizontal component and a vertical component of a motion vector difference is smaller than or equal to a predefined first threshold value and a predefined second threshold value, respectively. Alternatively, for example, correction for a first motion vector may be performed only when an absolute value of a horizontal component and a vertical component of a motion vector difference is smaller than a predefined first threshold value and a predefined second threshold value, respectively. As an example, a first threshold value and a second threshold value may be the same or different.

Alternatively, for example, correction for a first motion vector may be performed only when an absolute value of a horizontal component and a vertical component of a motion vector difference is greater than or equal to a predefined third threshold value and a predefined fourth threshold value, respectively. Alternatively, for example, correction for a first motion vector may be performed only when an absolute value of a horizontal component and a vertical component of a motion vector difference is greater than a predefined third threshold value and a predefined fourth threshold value, respectively. As an example, a third threshold value and a fourth threshold value may be the same or different.

In addition, in an embodiment of the present disclosure, when merge inter mode-based prediction is performed, a method for encoding a motion vector difference for a prediction direction in which motion information is derived based on an AMVP mode, but controlling motion vector correction by considering whether a motion vector difference is encoded is proposed. In other words, a method for adaptively perform correction based on whether a motion vector difference is encoded is proposed.

In other words, as described above, although an accurate motion vector may be derived for a prediction direction in which AMVP is applied from an encoded motion vector difference, motion vector correction may be performed only for a prediction direction in which a motion vector difference is not encoded in a merge inter mode, in order to solve the problem of redundantly correcting a motion vector having the lowest error within a predefined region based on an initial motion vector.

As an embodiment, in performing a motion vector correction process, correction may be performed only in a direction in which motion information is derived based on a merge mode.

As an embodiment, when a merge inter mode is applied to a current block and a second inter prediction mode is a merge mode, correction for a second motion vector may be performed. And, when a merge inter mode is applied to a current block and a first inter prediction mode is an AMVP mode, correction for a first motion vector may not be performed.

In addition, in an embodiment of the present disclosure, when merge inter mode-based prediction is performed, a method for encoding a motion vector difference for a prediction direction in which motion information is derived based on an AMVP mode, but deriving an initial motion vector by considering (or applying a motion vector difference in a motion vector correction process is proposed.

In the above-described embodiment, motion vector compensation is performed by configuring motion information of a candidate, i.e., a motion vector predictor as an initial motion vector on which motion vector correction is performed, and a final motion vector is derived by applying a motion vector difference which is encoded later.

As such, by performing correction based on a motion vector predictor and applying a motion vector difference to be encoded, there is a need to solve a problem that the effect of motion vector correction performed in an intermediate process disappears. To this end, a decoding device may apply a motion vector difference encoded for a motion vector of a prediction candidate, i.e., a motion vector predictor to derive an initial motion vector to be corrected, and then perform motion vector correction based thereon.

As an embodiment, an encoding device may add a motion vector difference encoded in a bitstream to a first motion vector. An encoding device may perform correction on a first motion vector to which a motion vector difference is added. In other words, motion vector correction may be performed on an initial motion vector, and the initial motion vector may be configured as a value obtained by adding a motion vector difference encoded in a bitstream to a motion vector predictor.

The above-described embodiments assume that a correction step in S610 is performed, but a motion vector correction process in S610 may be omitted. In this case, a prediction block generation process in S620 may be performed based on a first motion vector and a second motion vector derived in S600.

A prediction block of a current block may be generated based on at least one of the generated first prediction block or the generated second prediction block. As an example, a prediction block of a current block may be generated through a weighted sum of a first prediction block and a second prediction block. In this case, a weight for a weighted sum may be any one of a plurality of weight candidates that are equally predefined for an encoding device and a decoding device. To this end, a weight index that specifies any one of the plurality of weight candidates may be encoded and inserted into a bitstream. Alternatively, the weight index may be implicitly derived by considering the existence/number/position of neighboring blocks encoded in an intra mode, the existence/number/position of neighboring blocks encoded in an inter mode, a type of an inter prediction mode, the number/position of neighboring blocks encoded in an AMVP mode, the number/position of neighboring blocks encoded in a merge mode, etc.

Figure 7:
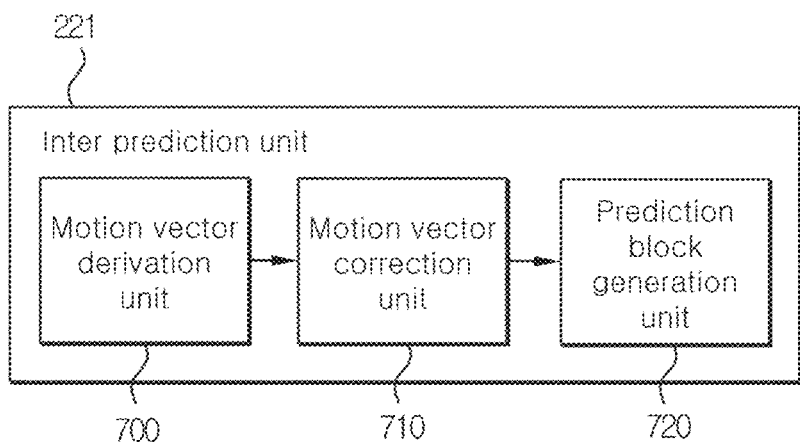
FIG. 7 shows a rough configuration of an inter prediction unit 221 that performs an inter prediction method based on a merge inter mode according to the present disclosure.

FIG. 7 shows a rough configuration of an inter prediction unit 221 that performs an inter prediction method based on a merge inter mode according to the present disclosure.

Referring to FIG. 7. an inter prediction unit 221 may include a motion vector derivation unit 700, a motion vector correction unit 710 and a prediction block generation unit 720. A motion vector derivation unit 700, a motion vector correction unit 710 and a prediction block generation unit 720 may perform S600 to S620 described above, respectively.

Specifically, a motion vector derivation unit 700 may derive a motion vector of a current block based on a merge inter mode. Here, a motion vector of a current block includes a motion vector for bilateral prediction, i.e., a motion vector in a first direction and a motion vector in a second direction, and a motion vector in a first direction and a second direction may be derived based on a different inter prediction mode. As an example, a motion vector derivation unit 700 may derive a motion vector in a first direction based on an AMVP mode, and may derive a motion vector in a second direction based on a merge mode. It is the same as described by referring to FIG. 4, and here, a detailed description is omitted.

A motion vector correction unit 710 may correct a motion vector of the current block based on a predetermined delta motion vector. In this case, a delta motion vector may be determined based on any one of a bilateral matching-based correction method or a template matching-based correction method. It is the same as described by referring to FIG. 4, and here, a detailed description is omitted.

A prediction block generation unit 720 may generate a prediction block of a current block based on a corrected motion vector. Here, a corrected motion vector includes a corrected first motion vector and a corrected second motion vector, and a first prediction block in a first direction and a second direction block in a second direction may be generated based on corrected first and second motion vectors, respectively. A method for generating a prediction block in each direction is the same as described by referring to FIG. 6 and here, a detailed description is omitted. A prediction block generation unit 720 may generate a prediction block of a current block based on at least one of a pre-generated first prediction block and a pre-generated second prediction block. As an example, a prediction block of a current block may be generated through a weighted sum of a first prediction block and a second prediction block.

Alternatively, if a motion vector of a current block is not corrected, a prediction block generation unit 720 may generate a prediction block of a current block by equally applying the above-described prediction block generation method based on a motion vector pre-derived according to a merge inter mode.

In the above-described embodiment, methods are described based on a flowchart as a series of steps or blocks, but a corresponding embodiment is not limited to the order of steps, and some steps may occur simultaneously or in different order with other steps as described above. In addition, those skilled in the art may understand that steps shown in a flowchart are not exclusive, and that other steps may be included or one or more steps in a flowchart may be deleted without affecting the scope of embodiments of the present disclosure.

The above-described method according to embodiments of the present disclosure may be implemented in a form of software, and an encoding device and/or a decoding device according to the present disclosure may be included in a device which performs image processing such as a TV, a computer, a smartphone, a set top box, a display device, etc.

In the present disclosure, when embodiments are implemented as software, the above-described method may be implemented as a module (a process, a function, etc.) that performs the above-described function. A module may be stored in a memory and may be executed by a processor. A memory may be internal or external to a processor, and may be connected to a processor by a variety of well-known means. A processor may include an application-specific integrated circuit (ASIC), another chipset, a logic circuit and/or a data processing device. A memory may include a read-only memory (ROM), a random access memory (RAM), a flash memory, a memory card, a storage medium and/or another storage device. In other words, embodiments described herein may be performed by being implemented on a processor, a microprocessor, a controller or a chip. For example, functional units shown in each drawing may be performed by being implemented on a computer, a processor, a microprocessor, a controller or a chip. In this case, information for implementation (ex. information on instructions) or an algorithm may be stored in a digital storage medium.

In addition, a decoding device and an encoding device to which embodiment(s) of the present disclosure are applied may be included in a multimedia broadcasting transmission and reception device, a mobile communication terminal, a home cinema video device, a digital cinema video device, a surveillance camera, a video conversation device, a real-time communication device like a video communication, a mobile streaming device, a storage medium, a camcorder, a device for providing video on demand (VoD) service, an over the top video (OTT) device, a device for providing Internet streaming service, a three-dimensional (3D) video device, a virtual reality (VR) device, an argumente reality (AR) device, a video phone video device, a transportation terminal (ex. a vehicle (including an autonomous vehicle) terminal, an airplane terminal, a ship terminal, etc.) and a medical video device, etc., and may be used to process a video signal or a data signal. For example, an over the top video (OTT) device may include a game console, a blu-ray player, an Internet-connected TV, a home theater system, a smartphone, a tablet PC, a digital video recorder (DVR), etc.

In addition, a processing method to which embodiment(s) of the present disclosure are applied may be produced in a form of a program executed by a computer and may be stored in a computer-readable recording medium. Multimedia data having a data structure according to embodiment(s) of the present disclosure may be also stored in a computer-readable recording medium. The computer-readable recording medium includes all types of storage devices and distributed storage devices that store computer-readable data. The computer-readable recording medium may include, for example, a blu-ray disk (BD), an universal serial bus (USB), ROM, PROM, EPROM, EEPROM, RAM, CD-ROM, a magnetic tape, a floppy disk and an optical media storage device. In addition, the computer-readable recording medium includes media implemented in a form of a carrier wave (e.g., transmission via the Internet). In addition, a bitstream generated by an encoding method may be stored in a computer-readable recording medium or may be transmitted through a wired or wireless communication network.

In addition, embodiment(s) of the present disclosure may be implemented by a computer program product by a program code, and the program code may be executed on a computer by embodiment(s) of the present disclosure. The program code may be stored on a computer-readable carrier.

Figure 8:
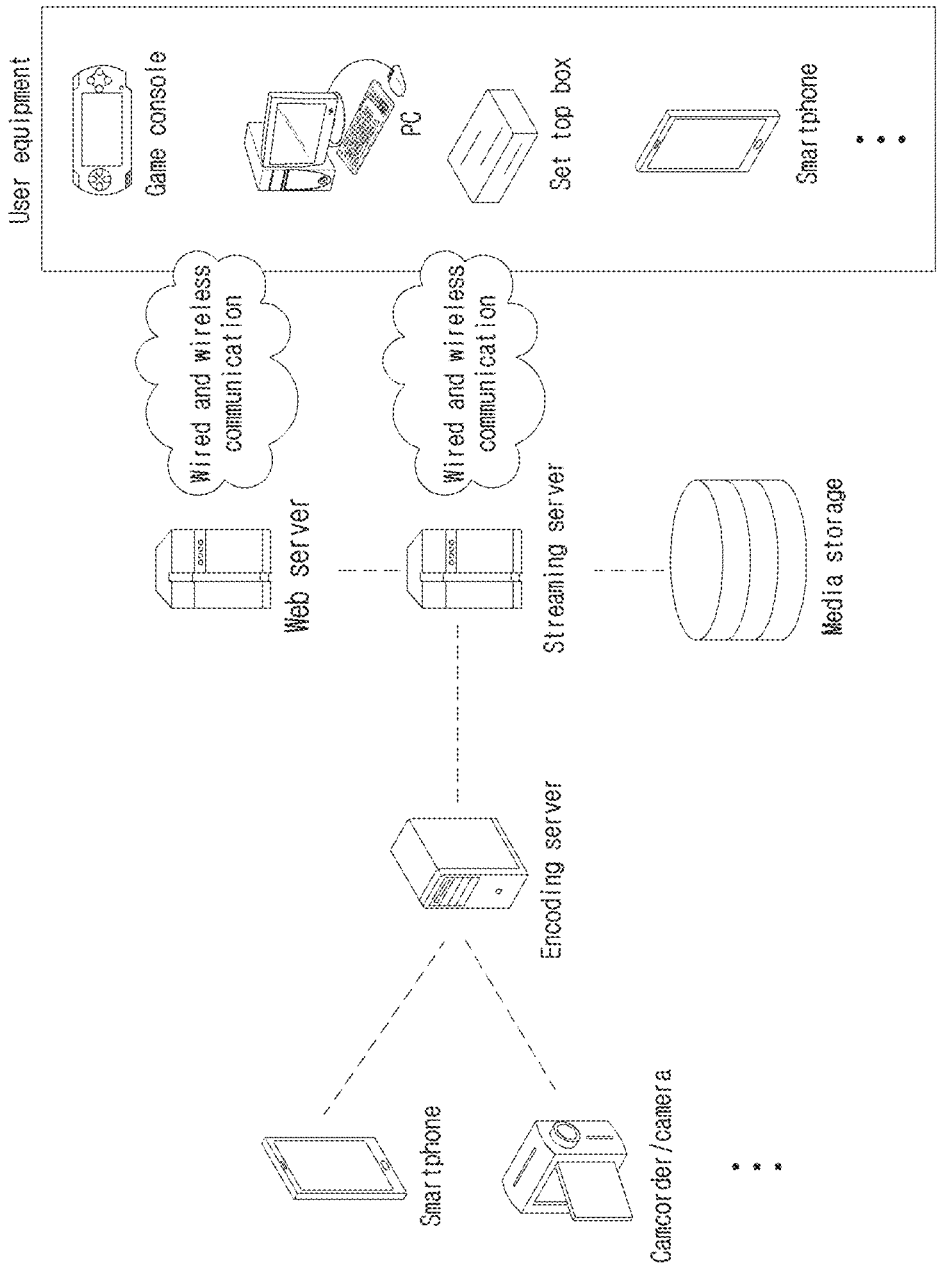
FIG. 8 shows an example of a contents streaming system to which embodiments of the present disclosure may be applied.

FIG. 8 shows an example of a contents streaming system to which embodiments of the present disclosure may be applied.

Referring to FIG. 8, a contents streaming system to which embodiment(s) of the present disclosure are applied may largely include an encoding server, a streaming server, a web server, a media storage, a user device and a multimedia input device.

The encoding server generates a bitstream by compressing contents input from multimedia input devices such as a smartphone, a camera, a camcorder, etc. into digital data and transmits it to the streaming server. As another example, when multimedia input devices such as a smartphone, a camera, a camcorder, etc. directly generate a bitstream, the encoding server may be omitted.

The bitstream may be generated by an encoding method or a bitstream generation method to which embodiment(s) of the present disclosure are applied, and the streaming server may temporarily store the bitstream in a process of transmitting or receiving the bitstream.

The streaming server transmits multimedia data to a user device based on a user's request through a web server, and the web server serves as a medium to inform a user of what service is available. When a user requests desired service from the web server, the web server delivers it to a streaming server, and the streaming server transmits multimedia data to a user. In this case, the contents streaming system may include a separate control server, and in this case, the control server controls a command/a response between each device in the content streaming system.

The streaming server may receive contents from a media storage and/or an encoding server. For example, when contents is received from the encoding server, the contents may be received in real time. In this case, in order to provide smooth streaming service, the streaming server may store the bitstream for a certain period of time.

An example of the user device may include a mobile phone, a smart phone, a laptop computer, a digital broadcasting terminal, a personal digital assistants (PDAs), a portable multimedia players (PMP), a navigation, a slate PC, a Tablet PC, an ultrabook, a wearable device (e.g., a smartwatch, a smart glass, a head mounted display (HMD), a digital TV, a desktop, a digital signage, etc.

Each server in the contents streaming system may be operated as a distributed server, and in this case, data received from each server may be distributed and processed.

The claims set forth herein may be combined in various ways. For example, a technical characteristic of a method claim of the present disclosure may be combined and implemented as a device, and a technical characteristic of a device claim of the present disclosure may be combined and implemented as a method. In addition, a technical characteristic of a method claim of the present disclosure and a technical characteristic of a device claim may be combined and implemented as a device, and a technical characteristic of a method claim of the present disclosure and a technical characteristic of a device claim may be combined and implemented as a method.

The invention claimed is:

1. An image decoding method, the method comprising:
deriving a motion vector of a current block based on a merge inter mode, wherein the motion vector of the current block includes a first motion vector in a first direction and a second motion vector in a second direction, the first motion vector is derived based on a first inter prediction mode, and the second motion vector is derived based on a second inter prediction mode,
correcting the motion vector of the current block, wherein the correction is performed on at least one of the first motion vector or the second motion vector,
based on the motion vector of the current block, generating a first prediction block in the first direction and a second prediction block in the second direction; and
based on the first prediction block and the second prediction block, generating a prediction block of the current block,
wherein based on the merge inter mode being applied to the current block and the first inter prediction mode being an advanced motion vector prediction (AMVP) mode, a motion vector difference for the AMVP mode is not obtained through a bitstream.

2. The method of claim 1, wherein
a motion vector correction of the current block is performed based on any one of a bilateral matching-based correction method or a template matching-based correction method.

3. The method of claim 1, wherein the second inter prediction mode is a merge mode.

4. The method of claim 1, wherein based on the merge inter mode being applied to the current block and the first inter prediction mode being an AMVP mode, a correction for the first motion vector is not performed.

5. An image encoding method, the method comprising:
deriving a motion vector of a current block based on a merge inter mode, wherein the motion vector of the current block includes a first motion vector in a first direction and a second motion vector in a second direction, the first motion vector is derived based on a first inter prediction mode, and the second motion vector is derived based on a second inter prediction mode;
correcting the motion vector of the current block, wherein the correction is performed on at least one of the first motion vector or the second motion vector,
based on the motion vector of the current block, generating a first prediction block in the first direction and a second prediction block in the second direction; and
based on the first prediction block and the second prediction block, generating a prediction block of the current block,
wherein based on the merge inter mode being applied to the current block and the first inter prediction mode being an advanced motion vector prediction (AMVP) mode, a motion vector difference for the AMVP mode is not signaled through a bitstream.

6. A method for transmitting data for image information, the method comprising:
generating a bitstream for the image information, wherein the bitstream is generated based on deriving a motion vector of a current block based on a merge inter mode, wherein the motion vector of the current block includes a first motion vector in a first direction and a second motion vector in a second direction, the first motion vector is derived based on a first inter prediction mode, and the second motion vector is derived based on a second inter prediction mode, correcting the motion vector of the current block, wherein the correction is performed on at least one of the first motion vector or the second motion vector, based on the motion vector of the current block, generating a first prediction block in the first direction and a second prediction block in the second direction, and based on the first prediction block and the second prediction block, generating a prediction block of the current block; and transmitting the data including the bitstream, wherein based on the merge inter mode being applied to the current block and the first inter prediction mode being an advanced motion vector prediction (AMVP) mode, a motion vector difference for the AMVP mode is not signaled through a bitstream.

* * * * *